July 3, 1928. W. J. ANDRES Re. 17,015

BRAKE

Original Filed July 25, 1925

INVENTOR
WILLIAM J. ANDRES
BY Jn. W. McCoubrey
ATTORNEY

Reissued July 3, 1928. Re. 17,015

UNITED STATES PATENT OFFICE.

WILLIAM J. ANDRES, OF SOUTH BEND, INDIANA, ASSIGNOR TO BENDIX BRAKE COMPANY, OF CHICAGO, ILLINOIS, A CORPORATION OF ILLINOIS.

BRAKE.

Original No. 1,640,589, dated August 30, 1927, Serial No. 46,041, filed July 25, 1925. Application for reissue filed January 18, 1928. Serial No. 247,722.

This invention relates to brakes, and is illustrated as embodied in an automobile brake. An object of the invention is to provide for increasing the effectiveness of a brake utilizing the drum friction as part of the brake-applying force, by arranging servo means to operate a friction member arranged to "wrap" either way,—i. e., arranged to anchor at opposite ends when the drum turns in opposite directions.

In one desirable arrangement there are two unanchored shoes, or other servo devices, spread against the drum, and one operating the friction member when the drum turns in one direction while the other operates it when the drum turns in the opposite direction. Preferably the whole is arranged as a central shoe with servo shoes connected at opposite ends, thus forming a convenient sub-assembly unit for independent shipment and sale.

Another very important feature of the invention relates to arranging a brake, of the type in which one part anchors when the drum is turning in one direction and a different part anchors when the drum is turning in the other direction, so that the applying means forces a portion of the friction means against the drum while both of said parts remain anchored, so that the friction of the drum holds the proper one of said parts against its anchorage during the final application of the brake. This avoids any disagreeable shock due to a shifting of the anchorage after the brake is applied.

Figure 1:
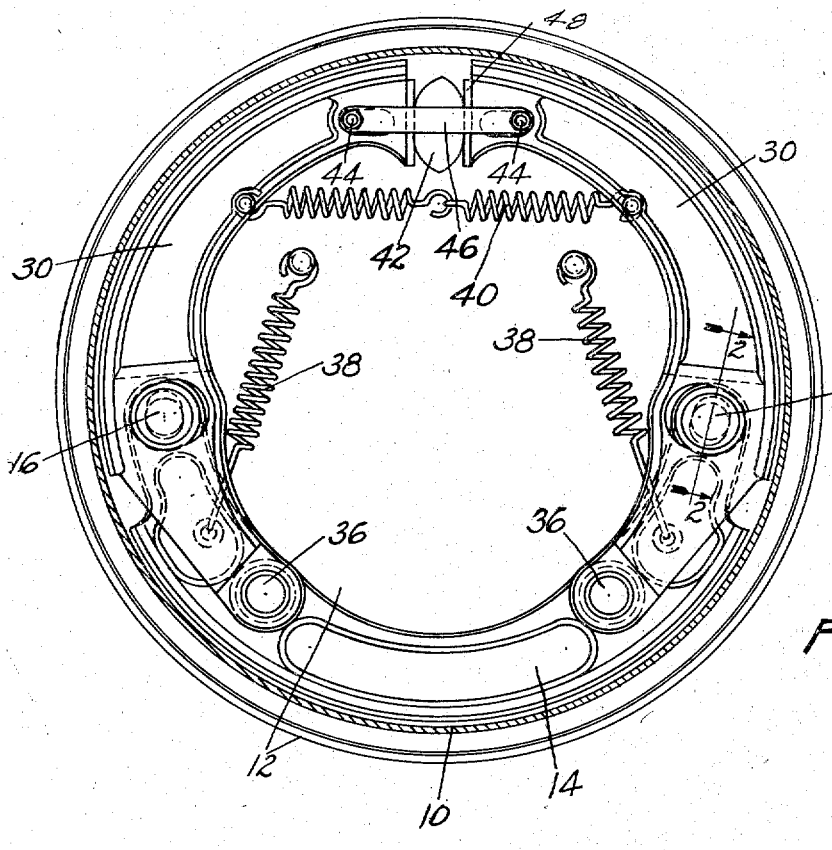
Figure 2:
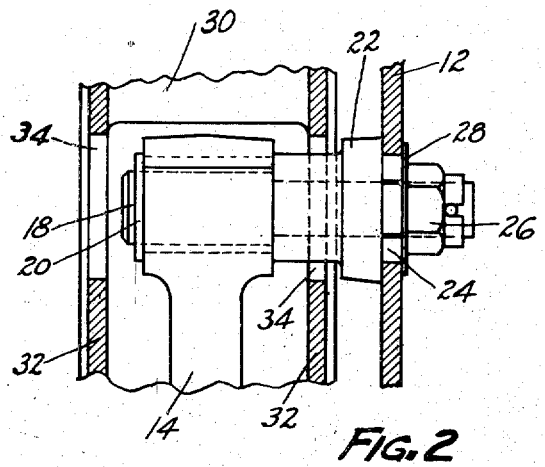

The above and other objects and features of the invention, including various novel combinations of parts and desirable particular constructions, will be apparent from the following description of one illustrative embodiment shown in the accompanying drawings, in which:

Figure 1 is a vertical section through the brake just inside the wheel, showing the shoes in side elevation; and Figure 2 is a section on the line 2—2 of Figure 1, showing one of the anchors.

In the arrangement selected for illustration, the brake includes a drum 10 and a backing plate or other support 12. Within the drum is the friction means of the brake, preferably including a friction member anchorable at either end, and shown as a central shoe 14 of T-section, having relatively large openings in its ends embracing the two anchors 16 and 18 carried by the backing plate 12.

As best shown in Figure 2, each anchor has a head seated against a washer 20 engaging the side of shoe 14 and a spacer 22 is threaded or otherwise secured on the anchor. Spacer 22 rests against the backing plate 12, which has a comparatively large opening 24 through which the anchor 18 (or 16) passes, thus permitting adjustment of the anchor. The anchor is secured in adjusted position by a nut 26 clamping the spacer 22 and a washer 28 against opposite sides of the backing plate.

At each end of shoe 14 is arranged one of two interchangeable servo shoes 30, each of which is shown forked at its end to provide arms (Figure 2) straddling the end of shoe 14. Each pair of arms 32 is formed with comparatively large openings 34 for one of the anchors. Each shoe 30 is secured to shoe 14 by a pin 36 having a head (not shown) slidably engaging the backing plate 12, and having a smooth cylindrical shank received in alined openings in arms 32 and the web of shoe 14, the pins 36 being held in place only by the backing plate. Thus by removing the two nuts 26, and the plate 46, the three shoes may be removed as a unit, and they may also be readily disconnected from each other by removing pins 36.

Springs 38 connected to the backing plate and to opposite ends of shoe 14 urge that shoe away from the drum to an idle position determined by anchors 16 and 18. A spring or springs 40 urge shoes 30 away from the drum.

Shoes 30 are spread apart to expand them against the drum by means shown as a double floating cam 42 of the type fully described in Patent No. 1,604,394, granted Bendix Brake Company October 26, 1926, on application of A. Y. Dodge. Posts 44 passing through slots in the ends of shoes 30 carry a plate 46 engaging the edges of the cam wear plates 48 to confine the ends of the shoes laterally.

When cam 42 is rocked to apply the brake, if the drum is turning in a clockwise direction, the right-hand shoe 30 forces shoe 14 against anchor 16, as permitted by the relatively large opening embracing anchor 18. The other shoe 30 has at this time comparatively little retarding effect, as the drum friction tends to swing it inwardly, but it has an important function in guarding against deformation of the drum. If the drum turns counter-clockwise, the left shoe 30 forces shoe 14 against anchor 18 in the same way. It will also be noted that in applying the brake, shoes 30 both engage the drum before shoe 14 leaves either of the anchors 16 or 18. Thus the friction of the drum holds shoe 14 against anchor 16 if the drum is turning clockwise, as the shoe leaves anchor 18 during the final application of the brake, and conversely if the drum is turning counterclockwise it holds shoe 14 against anchor 18 during the final application of the brake. There is thus no shifting of the anchorage at all during the application of the brake, in spite of the fact that shoe 14 sometimes anchors at one end and sometimes at the other.

While one illustrative embodiment of the invention has been described in detail, it is not my intention to limit its scope to that particular embodiment, or otherwise than by the terms of the appended claims.

I claim:

1. A brake for a vehicle comprising, in combination, a retarding device, anchoring means engaging the retarding device, and a pair of oppositely-effective servo devices, one of which is arranged to operate the retarding device when the vehicle is moving forward and the other of which is arranged to operate the retarding device when the vehicle is moving backward.

2. A brake comprising, in combination, a drum, a retarding device engageable with the drum, anchoring means engaging the retarding device, and a pair of oppositely-effective servo devices also engageable with said drum, one of which is arranged to operate the retarding device when the drum is turning in one direction and the other of which is arranged to operate the retarding device when the drum is turning in the opposite direction.

3. A brake comprising, in combination, a drum, a retarding device and two servo devices all engaging said drum, anchoring means engaging the retarding device, a connection operated by one servo device for applying the retarding device when the drum is turning in one direction, and a different connection operated by the other servo device to apply the retarding device when the drum is turning in the other direction.

4. A brake comprising, in combination, a drum, a retarding device engageable with the drum and anchoring at its opposite ends according to the direction of movement of the drum, and servo means pivotally connected to the retarding device and urged circumferentially by the friction of the drum and arranged to force the retarding device against the drum in either direction of drum rotation.

5. A brake comprising, in combination, a drum, a retarding device engageable with the drum and anchoring at its opposite ends according to the direction of movement of the drum, and a pair of servo devices urged circumferentially by the friction of the drum and so arranged that one or the other forces the retarding device against the drum in either direction of drum rotation.

6. A brake comprising, in combination, a drum, a friction device within the drum, means at each end of the friction device to take the braking torque according to the direction of drum rotation, and servo means connected to the friction device and urged by the friction of the drum to force the friction device against the drum, the friction device and the servo means engaging successively the same surface of the drum.

7. A brake comprising, in combination, a drum, a friction device within the drum, means at each end of the friction device to take the braking torque according to the direction of drum rotation, and a servo shoe at each end of said device and one or the other of which shoes is urged by the friction of the drum to force the friction device against the drum according to the direction of rotation, the friction device and the servo shoes engaging successively the same surface of the drum.

8. A brake comprising, in combination, a drum, a shoe within the drum, an anchor at each end of the shoe, spring means urging the shoe away from the drum, and servo means connected to the shoe and urged by the friction of the drum and overcoming the spring means to force the shoe against the drum and against one or the other of the anchors according to the direction of drum rotation.

9. A brake comprising, in combination, a drum, a shoe within the drum, an anchor at each end of the shoe, a pair of springs connected to the shoe near its ends and urging the shoe away from the drum, and servo means connected to the shoe and urged by the friction of the drum and overcoming the springs to force the shoe against the drum and against one or the other of the anchors according to the direction of drum rotation.

10. A brake comprising, in combination, a drum, a shoe within the drum having an anchor at each end, a pair of shoes connected to the first shoe at its ends and engageable with the drum, and means for forcing the pair of shoes apart against the drum.

11. A brake comprising a floating retarding device consisting of connected rigid sections, and anchoring devices arranged at opposite ends of one of said sections, one or the other of the anchoring devices taking the braking torque of the entire retarding device.

12. A brake comprising, in combination, a drum, a floating retarding device consisting of connected rigid sections, and anchoring devices arranged at opposite ends of an intermediate one of said sections, one or the other of the anchoring devices taking the braking torque of the entire retarding device according to the direction of rotation of the drum.

13. A brake comprising, in combination, a drum, a floating retarding device engageable with the drum, and three devices spaced approximately 120° apart about the drum and including an expanding device to apply the brake, and two anchoring devices one of which takes the torque of the retarding device when the drum is turning in one direction and the other of which takes said torque when the drum is turning in the other direction.

14. A friction device for a brake including a central shoe, a servo shoe connected to each end of the central shoe, and an anchor at each end of the central shoe.

15. A friction device for a brake including a central shoe, a servo shoe connected to each end of the central shoe and forked to straddle the end of the central shoe, and an anchor at each end of the central shoe, the three shoes forming a connected sub-assembly unit.

16. A friction device for a brake comprising, in combination, a central shoe, a servo shoe at each end of the central shoe and connected thereto at some distance from its end to give the effect of overlapping the shoes, and an anchor at each end of the central shoe passing freely through a relatively large opening in the corresponding servo shoe.

17. A friction device for a brake comprising, in combination, a central shoe, a servo shoe at each end of the central shoe and connected thereto at some distance from its end to give the effect of overlapping the shoes, and an anchor at each end of the central shoe.

18. A brake comprising, in combination, a drum, a support, a pair of connected oppositely extending shoes within the drum, one of which is pivotally mounted on the other, and an anchor for the connected end of said other shoe adjustably mounted on the support.

19. A brake comprising, in combination, a drum, a support, a central shoe, a pair of shoes pivoted on the central shoe, and anchors for said central shoe at its opposite ends which are adjustably mounted on the support.

20. A brake comprising, in combination, a drum, a friction device engageable with the drum and arranged to have one part anchor when the drum is turning in one direction and to have a different part anchor when the drum is turning in the other direction, and applying means for forcing a portion of the friction device against the drum while both of said parts remain anchored and for completing the application of the brake while the friction of the drum holds one or the other of said parts in anchored position.

21. A brake comprising, in combination, a drum, a friction device engageable with the drum and arranged to have a part anchor at one side of the drum when the drum is turning in one direction and to have a different part anchor at the other side of the drum when the drum is turning in the other direction, and applying means for forcing a portion of the friction device against the drum while both of said parts remain anchored and for completing the application of the brake while the friction of the drum holds one or the other of said parts in anchored position.

22. A brake comprising, in combination, a drum, a friction device engageable with the drum and arranged to have one part anchor when the drum is turning in one direction and to have a different part anchor when the drum is turning in the other direction, and applying means for forcing a portion of the friction device against the drum while both of said parts remain anchored and for thereafter completing the application of the brake.

23. A brake comprising, in combination, a pair of separated anchors, a rotatable drum, friction means engageable with the drum and anchoring on one of said anchors when the drum is turning in one direction and on the other of said anchors when the drum is turning in the other direction, and means for forcing a portion of the friction means against the drum while the friction means remains in engagement with both of said anchors and then completing the application of the brake while the friction of the drum holds the friction means against one or the other of the anchors.

24. A brake comprising, in combination, a pair of separated anchors, a rotatable drum, friction means engageable with the drum and anchoring on one of said anchors when the drum is turning in one direction and on the other of said anchors when the drum is turning in the other direction, applying means for forcing the friction means against the drum, and yielding means for holding the friction means against both of said anchors until after a portion of the friction means is in engagement with the drum.

25. A brake comprising, in combination, a pair of separated anchors, a rotatable drum, friction means engageable with the drum and anchoring on one of said anchors when the drum is turning in one direction and on the other of said anchors when the drum is turning in the other direction, applying means for forcing the friction means against the drum, and a spring for holding the friction means against both of said anchors until after a portion of the friction means is in engagement with the drum.

26. A brake comprising, in combination, a rotatable drum, friction means engageable with the drum and arranged to have one part anchor when the drum is turning in one direction and to have a different part anchor when the drum is turning in the other direction, applying means for forcing the friction means against the drum, and yielding means for holding both of said parts anchored while a portion of the friction means is preliminarily forced against the drum by the applying means, whereby the friction of the drum on said portion will hold the one or the other of said parts anchored during the full application of the brake.

27. A brake comprising, in combination, a drum, an applying device and two anchors spaced approximately 120° apart about the drum, and friction means forced by the applying device against the drum and anchoring on said anchors.

28. A brake comprising, in combination, a drum, an applying device and two anchors spaced approximately 120° apart about the drum, and friction means forced by the applying device against the drum and anchoring on one of said anchors when the drum is turning in one direction and on the other of said anchors when the drum is turning in the other direction.

29. A brake comprising, in combination, a drum, a friction device adjacent the drum having one part arranged to anchor when the drum is turning in one direction and having another part arranged to anchor when the drum is turning in the other direction, and auxiliary friction means pivotally connected to said friction device and arranged preliminarily to engage the drum, during the application of the brake, while both of said parts remain anchored, and to hold one or the other of said parts anchored during the full application of the brake.

30. A brake comprising, in combination, a drum, a friction device adjacent the drum having one part arranged to anchor when the drum is turning in one direction and having another part arranged to anchor when the drum is turning in the other direction, and a pair of shoes pivotally connected to said friction device and arranged preliminarily to be forced apart against the drum, during the application of the brake, while both of said parts remain anchored, and to hold one or the other of said parts anchored during the full application of the brake.

31. A brake comprising, in combination, a drum, a friction device adjacent the drum having one part arranged to anchor when the drum is turning in one direction and having another part arranged to anchor when the drum is turning in the other direction, yielding means holding said parts anchored, shoes connected to opposite ends of said device, and an applying device for forcing the shoes apart against the drum, while both of said parts are held anchored by said means, during the preliminary part of the brake-applying action.

32. A brake comprising, in combination, a drum, friction means including a set of pivotally connected shoes arranged to have one part anchor when the drum is turning in one direction and to have a different part anchor when the drum is turning in the other direction, and applying means for forcing at least the free ends of the shoes against the drum while both of said parts remain anchored, prior to the full application of the brake.

33. A brake comprising, in combination, a drum, friction means within the drum having adjacent movable ends and which means is arranged to have one part anchor when the drum is turning in one direction and to have a different part anchor when the drum is turning in the other direction, and applying means for forcing at least said ends against the drum while both of said parts remain anchored, prior to the full application of the brake.

34. A brake comprising, in combination, a drum, friction means within the drum having adjacent movable ends and which means is arranged to have one part anchor when the drum is turning in one direction and to have a different part anchor when the drum is turning in the other direction, and applying means engaging said ends and arranged to force at least said ends of the friction means against the drum while both of said parts remain anchored, prior to the full application of the brake, and which applying means is thereafter operable to force said ends apart to reinforce the brake-applying action of the drum friction.

In testimony whereof, I have hereunto signed my name.

WILLIAM J. ANDRES.